United States Patent
Lang (10) Patent No.: US 7,471,234 B1
(45) Date of Patent: Dec. 30, 2008

(54) PRODUCING IMPROVED MOSAIC OF MULTIPLE FIELD RADAR DATA PRODUCT TO ENABLE IMPROVED WEATHER DISPLAY

(75) Inventor: Joseph C. Lang, Havertown, PA (US)

(73) Assignee: Unisys Corporation, Blue Bell, PA (US)

( * ) Notice: Subject to any disclaimer, the term of this patent is extended or adjusted under 35 U.S.C. 154(b) by 95 days.

(21) Appl. No.: 11/013,746

(22) Filed: Dec. 16, 2004

(51) Int. Cl.
*G01S 13/95* (2006.01)
*G01S 13/89* (2006.01)

(52) U.S. Cl. .................... 342/26 R; 342/26 D; 342/179

(58) Field of Classification Search ............... 342/26 D, 342/26 R
See application file for complete search history.

(56) References Cited

U.S. PATENT DOCUMENTS

| | | | | |
|---|---|---|---|---|
| 5,742,297 A * | 4/1998 | Logan | ........................ | 345/672 |
| 6,405,134 B1 * | 6/2002 | Smith et al. | ..................... | 702/4 |
| 6,850,184 B1 * | 2/2005 | Desrochers et al. | ....... | 342/26 D |
| 2003/0072470 A1 * | 4/2003 | Lee | ............................ | 382/103 |

* cited by examiner

*Primary Examiner*—Thomas H. Tarcza
*Assistant Examiner*—Matthew M Barker
(74) *Attorney, Agent, or Firm*—Richard J. Gregson; Nathan Cass; Robert P. Marley (57) ABSTRACT

The system or method reduces the significant degradation of quality in Radar mosaic products that are contaminated by non-meteorological returns. In regions covered by multiple radars, the inventive algorithms utilize an inventive set of coverage-based rules for comparing returns from different radars in order to identify and suppress non-meteorological returns.

13 Claims, 8 Drawing Sheets

CONTEXT OF THE MOSAIC GENERATION ALGORITHM

FIG. 1 – CONTEXT OF THE MOSAIC GENERATION ALGORITHM

FIG. 2 – FLOW DIAGRAM FOR MOSAIC GENERATION ALGORITHM

FIG. 3 – EXAMPLE OF SUPPORT LEVEL DETERMINATION

FIG. 4 – EXAMPLE OF WEATHER ENVELOPE DETERMINATION

FIG. 6 – RADAR COVERAGE MODEL FOR CASE 1 HIGH-CONFIDENCE CONTRIBUTOR TEST

FIG. 7 – RADAR COVERAGE MODEL FOR CASE 2 HIGH-CONFIDENCE CONTRIBUTOR TEST

Fig. 8

PRODUCING IMPROVED MOSAIC OF MULTIPLE FIELD RADAR DATA PRODUCT TO ENABLE IMPROVED WEATHER DISPLAY

BACKGROUND OF THE INVENTION

1. Field of the Invention

This invention relates generally to the use of radar coverage information derived from terrain elevation data in generating mosaic products of weather radar returns from multiple weather radars. The invention specifically describes the use of terrain-based radar coverage information in an algorithm for generating mosaic products (i.e., products that cover more than one radar coverage area) from composite reflectivity radar products generated by weather radars.

2. Background

Weather radar returns are often contaminated by non-meteorological artifacts present in the data that are unrelated to the primary observation objective of the radar, namely weather observations. For example, the United States Government operates a network of WSR-88D weather surveillance radars in the continental US, Alaska and Hawaii which provide real-time weather information. The data from these radars is frequently contaminated by returns that are of non-meteorological origin, for example: ground clutter returns, anomalous propagation (AP) returns caused by refraction of the radar beam in the atmosphere, RF interference returns, solar interference returns, spurious returns caused by degraded or failed radar signal processing components in the WSR-88D radars, returns from air-borne dust and insects, and other known and unknown anomalies. Mosaic generation algorithms that simply combine the returns from weather radars with overlapping coverage areas produce mosaic products which may contain significant non-meteorological content. There can be substantial economic or human costs attributable to inaccuracy over a mosaic region, especially where the mosaic is relied upon in aviation or ground based transportation decision-making. Therefore, producing mosaic products without significant non-meteorological content is an important goal.

The objective in designing a weather mosaic generation algorithm is to maximize suppression of non-meteorological returns and to minimize removal of valid weather returns. For many applications there can be a severe penalty for removing valid weather returns (for example, weather products used in air traffic control applications). Various algorithmic processes for generating mosaic products from multiple weather radars have been developed to identify and remove non-meteorological returns with varying levels of success. Some of the algorithmic approaches used in designing mosaic generation algorithms are:

1. Select data from closest radar.
2. Select data from radar with the best view (view can be based on terrain elevation information).
3. Assigning confidence levels to individual contributors (for example, a variety of range-based strategies are used for assigning confidence levels).
4. Compute confidence-based average of contributing radars.
5. Select highest confidence contributor.
6. Select highest supported contributor.
7. Using other types of data to validate radar returns (satellite images, weather model outputs, etc.).

The invention describes a preferred embodiment set of algorithms that utilize terrain-based radar coverage information for generating weather mosaic products from WSR-88D composite reflectivity product data. They can be applied to other radar mosaic products as well, as one of ordinary skill in this area of endeavor will readily appreciate. Composite reflectivity radar products are generated by the WSR-88D radars by combining data at a given range/azimuth location with respect to the radar location from multiple elevation tilts that provide coverage within the elevation layer of interest (for example, surface to 18,000 meters). The radar coverage information used by this algorithm are radar-specific radar coverage maps which specify the minimum viewable elevation above mean sea level (MSL) for each radar product bin. The coverage maps have the same spatial resolution as the corresponding radar product data. The preferred techniques for generating radar coverage maps for composite reflectivity products from terrain elevation data are described in U.S. Pat. No. 6,771,207, incorporated herein in its entirety by this reference thereto.

It should be recognized that the teachings of this invention can apply to data from other types of weather radars, and to other types of weather radar products (single tilt base reflectivity product data, layer composite reflectivity product data, vertical integrated liquid (VIL) product data, etc.

SUMMARY OF THE INVENTION

The mosaic generation algorithm of this invention is a variant of a highest contributor algorithm. A basic highest contributor algorithm simply selects the highest contributing radar product bin value as the mosaic bin value. The algorithm described in this invention selects the highest contributor value provided that there is either direct support from another contributor, or the highest contributor value is not inconsistent with the data levels being reported by other contributing radars based on a hierarchical set of rules. The algorithm utilizes radar coverage maps as the basis for comparing data levels from contributing radar product bins. Radar coverage maps are radar specific. These maps have the same spatial resolution and coverage areas as the corresponding composite reflectivity radar products. The coverage maps are generated from terrain elevation data information, preferably generated in ways taught in U.S. Pat. No. 6,771,207, referenced above, although other methods could be used. The coverage maps specify the minimum viewable elevation above Mean Sea Level (MSL) for the corresponding radar product data bins.

The preferred embodiment of the invention describes a sequence of processing steps used to select a value for an individual mosaic product bin that is covered by multiple contributing radars, when at least one of the contributing radars has detected a significant return. The mosaic generation algorithm computes a value for each mosaic product bin in accord with a sequence of qualifying steps. This qualified value for each bin then is used to produce a mosaic product that we believe to be significantly improved over the existing mosaic products using other algorithms.

DETAILED DESCRIPTION OF THE PREFERRED EMBODIMENTS

Figure 1:
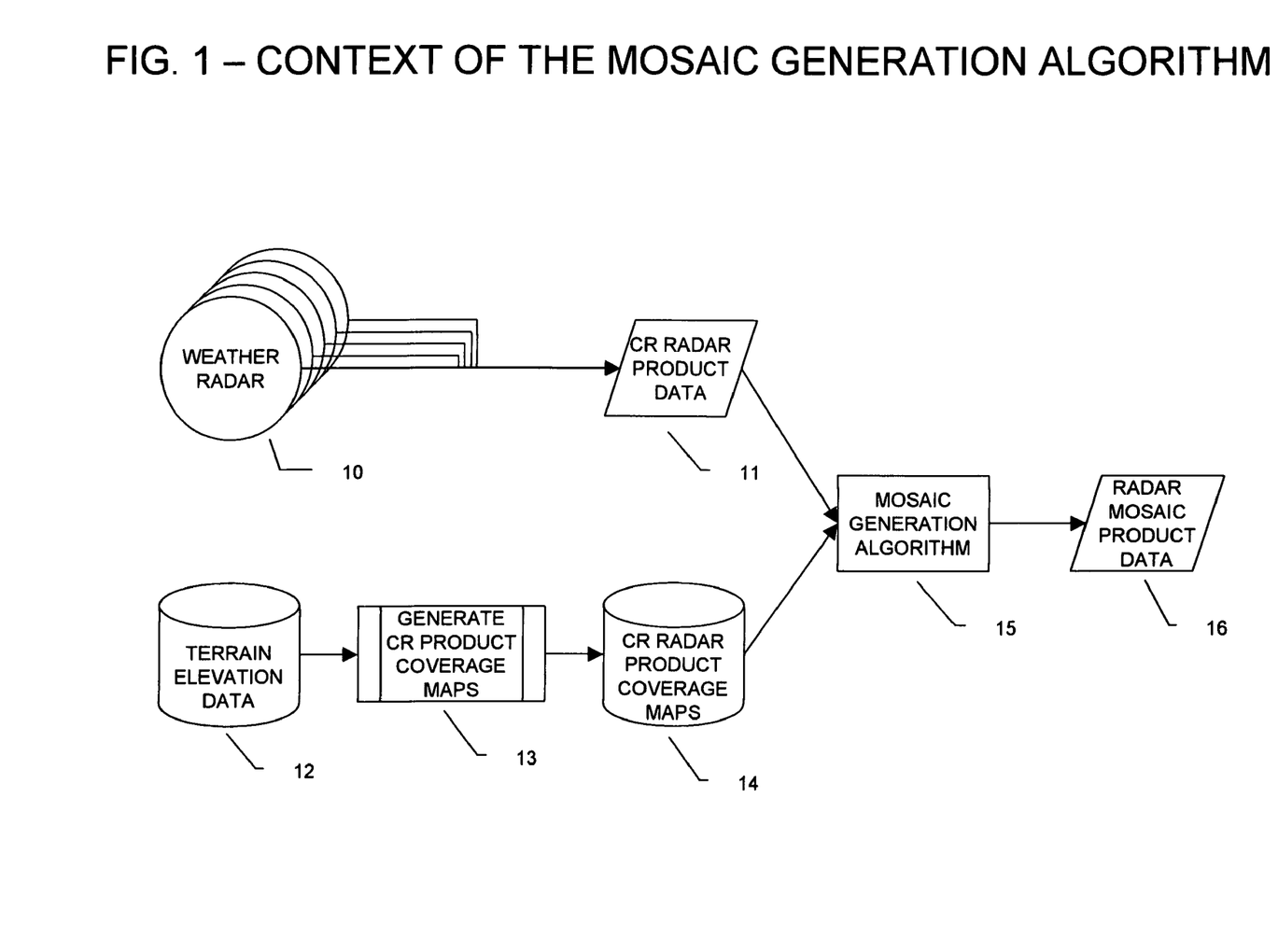
FIG. 1 is a block diagram illustrating the use of the invention in context.

Refer to FIG. 1 which illustrates the context of the invention. The lines connecting the components indicate the flow of data through whatever means, preferably high speed data channels, although these links could be software channels or RF channels or off-line processing functions, given various technologies and the steps involved. The invention describes a real-time mosaic generation algorithm 15, which can be implemented in hardware or software or some combination thereof, the algorithm being a variant of a "highest contributor" algorithm. The inventive algorithm selects the highest contributor value, provided that there is either direct support from another contributor, or the highest contributor value is not inconsistent with the data levels being reported by other contributing radars. The input to the mosaic generation algorithm is radar product data 11 received from an array of contributing weather radars 10 having overlapping coverage areas. The specific preferred embodiment of the invention described herein is an algorithm designed to generate mosaic products from WSR-88D composite reflectivity (CR) radar product data. CR radar products are generated by combining data from all elevations scanned by the radar. Each bin of a CR product nominally specifies a combined data level observed by the radar in the column of the atmosphere from the surface of the earth up to the maximum coverage elevation of the radar above the geographic area covered by the bin. In reality, because of the effects of earth curvature and terrain blockage, the elevation coverage range for a CR product bin does not always extend all the way to the earth's surface. The actual minimum radar coverage elevation varies from bin to bin. The mosaic generation algorithm 15 described below utilizes radar coverage maps 14 as the basis for comparing data levels from contributing radar product bins. Radar coverage maps are radar product specific. These maps have the same spatial resolution and coverage areas as the corresponding CR radar products. The coverage maps for CR radar products specify the minimum covered elevation above MSL for the corresponding radar product data bins. The coverage maps are generated from terrain elevation data base information 12 by a coverage map generation function 13. For a detailed description of the preferred embodiments for generating radar coverage maps using process 13 and terrain elevation databases 14, refer to U.S. Pat. No. 6,771,207, referenced above. The output of the invention is a radar mosaic weather product (16) that provides accurate information on current weather conditions that can be used in a variety of applications.

The invention uses a sequence of processing steps to select a value for an individual mosaic product bin that is covered by multiple contributing radars, and wherein at least one of the contributing radars has detected a significant return. The mosaic generation algorithm computes a value for each mosaic product bin using the following sequence of steps which are described in the following sections:

1. Assemble contributing radar product bin data set for the mosaic bin.
2. Determine weather envelope elevation for the mosaic bin from the contributing radar product bin data and radar coverage information.
3. Use weather envelope elevation to classify contributing radar product bins as high-confidence or low-confidence contributors.
4. Determine highest and second highest high-confidence contributor data levels.
5. Perform high-confidence contributor test to select an initial mosaic bin value from high-confidence contributor data.
6. Perform low-confidence contributor test to revise the mosaic bin value using low-confidence contributor data.

All of the bins are processed in accord with these procedures, and at that time, the mosaic data can be used. The processing can occur seriatim as in a FOR loop where processes 1-6 are repeated for each bin, or in parallel, depending on the facilities available for such processing. After all bins have been processed, the mosaic is ready for viewing, display, or other potential uses.

Figure 8:
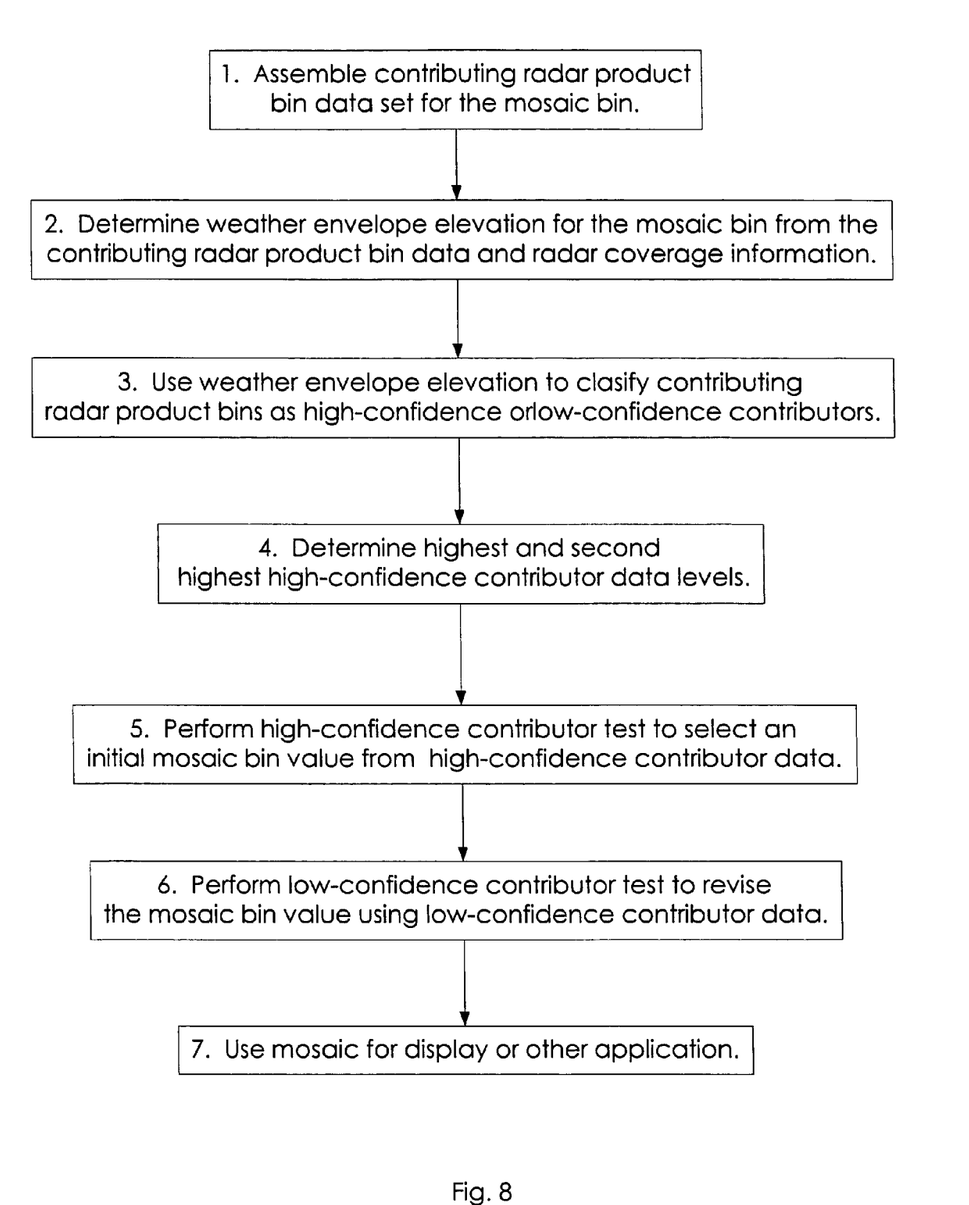
FIG. 8 is a flow diagram illustrating a preferred embodiment methodology in accord with the invention.

Generally, the flow of the operation of preparing the mosaic in accord with preferred embodiments of the invention will proceed in this order, as illustrated in FIG. 8, with processes 1-6 shown as individual processes in the flow chart and with the final use of the completed mosaic process 7. Processes 1-6 can be thought of as steps in a FOR loop, iteratively operating until all the bins of the mosaic have been processed, and Process 7 can be seen as the next step outside the FOR loop. Thus, after step 6 is completed for one bin, we loop back to the next bin and start at process 1 again until all the bins have been handled in accord with the invention. Then the bin values are ready for display as a mosaic. Alternatively to the FOR loop concept, the processing of the bins can occur in parallel if the proper computing resources are made available, and the mosaic can be prepared much more quickly. Because either alternative is available, FIG. 8 does not have a structure similar to the flow chart for a FOR loop.

The mosaic generation algorithm described here was developed for generating radar mosaic products from WSR-88D composite reflectivity product data for use in air traffic control operations. It is very important that radar mosaic products used for air traffic control operations: reflect the current weather conditions; contain minimal non-meteorological content; and not degrade valid weather returns (especially severe weather returns).

The algorithm described here is specifically adapted to optimize performance for air traffic control operations. The examples used to illustrate the processing steps of the algorithm are based on WSR-88D composite reflectivity product data. The techniques described here can be adapted by someone versed in the art for generating mosaic products from data from other types of weather radars, from other types of radar product data (for example, layer composite reflectivity products, VIL, etc.), and for other types of applications.

Radar mosaic products are generated from sets of individual radar products where each radar product provides radar coverage for some portion of the geographic area covered by the mosaic product. Mosaic products are generally raster arrays where each bin of the raster array specifies a data level for a small area (i.e. 4 kilometers (km)×4 km would be a reasonable small area) of the mosaic product projection space. Radar products used to generate mosaic products also include a data array where each bin of the array specifies a data level for a small area (i.e. an area of 4 km×4 km would be a reasonable "small area", but different sized areas could be used if desired, given different types of radars and radar product data, different regions, or different applications to which this invention is applied) of the radar product projection space. Standard techniques are used to map data from individual radar product bins into mosaic product bins. In regions of the mosaic product where mosaic bins are covered by multiple radar product bins, some type of strategy must be used to select the value of the mosaic bin from the set of covering radar product bins. (For regions of a mosaic product where mosaic bins are covered by a single contributing radar product bin, mosaic bins are simply assigned the value of the single contributing radar product bin, but these are not the subject of this invention.) A highest contributor mosaic generation strategy simply assigns each mosaic bin the value of the contributing radar bin with the highest data level.

The invention is a radar mosaic generation algorithm that is a variant of the highest contributor rule that performs a series of comparisons to determine if the highest contributor value is consistent (or inconsistent) with the other contributing radar product bins. If the highest contributor value is found to be inconsistent with the other contributors, the mosaic bin is assigned the value of the next highest contributor. The invention describes the sequence of processing steps used to select a value for an individual mosaic product bin that is covered by multiple contributing radars, where at least one of the contributing radars has detected a significant return.

Figure 2:
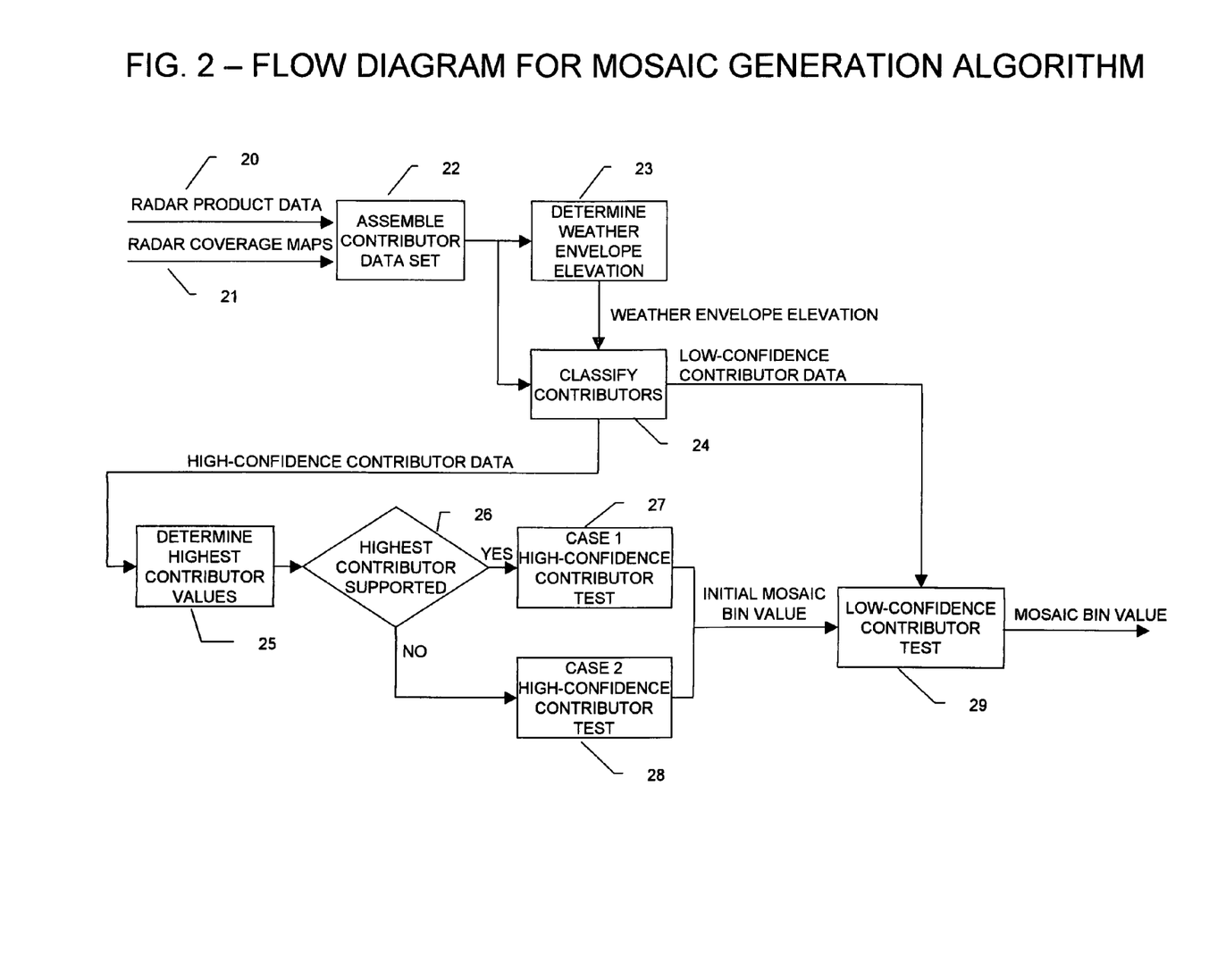
FIG. 2 is a flow chart illustrating the functioning of a preferred embodiment algorithm in accord with the invention.

The processing sequence and data flow relationships for determining mosaic bin values are illustrated in FIG. 2. The inputs to the algorithm consist of the CR radar product data from each of the contributing radars 20, and the corresponding CR product radar coverage maps 21. The first processing step 22 is to assemble a data set consisting of information for each radar product bin that provides coverage for the mosaic bin. This step utilizes standard data re-projection techniques to determine which radar product bins map onto a particular mosaic product bin. U.S. Pat. No. 5,742,297 describes re-projection and is incorporated by this reference for convenience. The contributor data set information is then used to determine the weather envelope elevation 23. This determination is described in greater detail later, as are all the determinations made and mentioned in this FIG. 2.

The weather envelope elevation is somewhat analogous to an echo tops elevation. It is an estimate of the elevation below which valid weather returns may have been detected for the mosaic bin. The weather envelope elevation is then used to classify each of the contributing radar product bins 24 as either a high-confidence contributor or a low-confidence contributor. The high-confidence contributor data is then used determine the highest and second highest high-confidence contributor data levels 25. This processing step also determines a support level value for the highest contributor data level.

In the next processing step 26 the support level value determined in step 25 is used to determine which of two tests will be used to select a mosaic bin value based on the high-confidence contributor data. If there is some level of support for the highest high-confidence contributor (the highest contributor support level is at or above a significant return threshold level), a Case 1 high-confidence contributor test 27 is used to select the mosaic bin value. If there is no support for the highest high-confidence contributor (only one high-confidence contributor is reporting a data level at or above a significant return threshold level), a Case 2 high-confidence contributor test 28 is used to select the mosaic bin value. These two tests each use radar coverage information as the basis for comparing the highest and second highest high-confidence contributor data levels and selecting which of the two values is selected as an initial estimate of the mosaic bin value. In the last processing step 29, the low-confidence contributor data (if there is any) is compared to the high-confidence contributor value selected as the initial estimate of the mosaic bin value in step 27 or 28. The low-confidence contributor data may represent returns from rapidly developing weather that should be incorporated into the mosaic product. This test uses contributor data level, radar coverage, and update time information to determine whether a low-confidence contributor data level should be selected for the mosaic bin value instead of the value selected by the high-confidence contributor test. At the conclusion of this step the mosaic array bin is set to the selected mosaic bin value.

The following paragraphs provide detailed descriptions of the preferred embodiments for each of these processing steps for generating mosaic products from composite reflectivity radar product data.

1 Assemble Contributing Radar Product Bin Data Set

The data set used to select the mosaic bin value includes the following information for each of the contributing CR radar product bins:

1. Radar product bin value
2. Radar product bin support level
3. Minimum radar coverage elevation
4. Radar product bin update time The radar product bin value is extracted from the radar product data array; it specifies the intensity of detected radar returns in Dbz units. If the extracted bin value is less than a significant return threshold level, the bin value is set to a value which indicates that no significant returns have been detected. In our preferred embodiments, a "significant" weather return threshold level is 5 Dbz. (The reader is advised to use other significant return threshold values to adapt the algorithm for specific applications). All returns less than this significant weather return threshold (of 5 Dbz) are assigned the value: <5 Dbz. The mosaic generation algorithm will select one of the contributing radar product bin values as the mosaic bin value.

Figure 3:
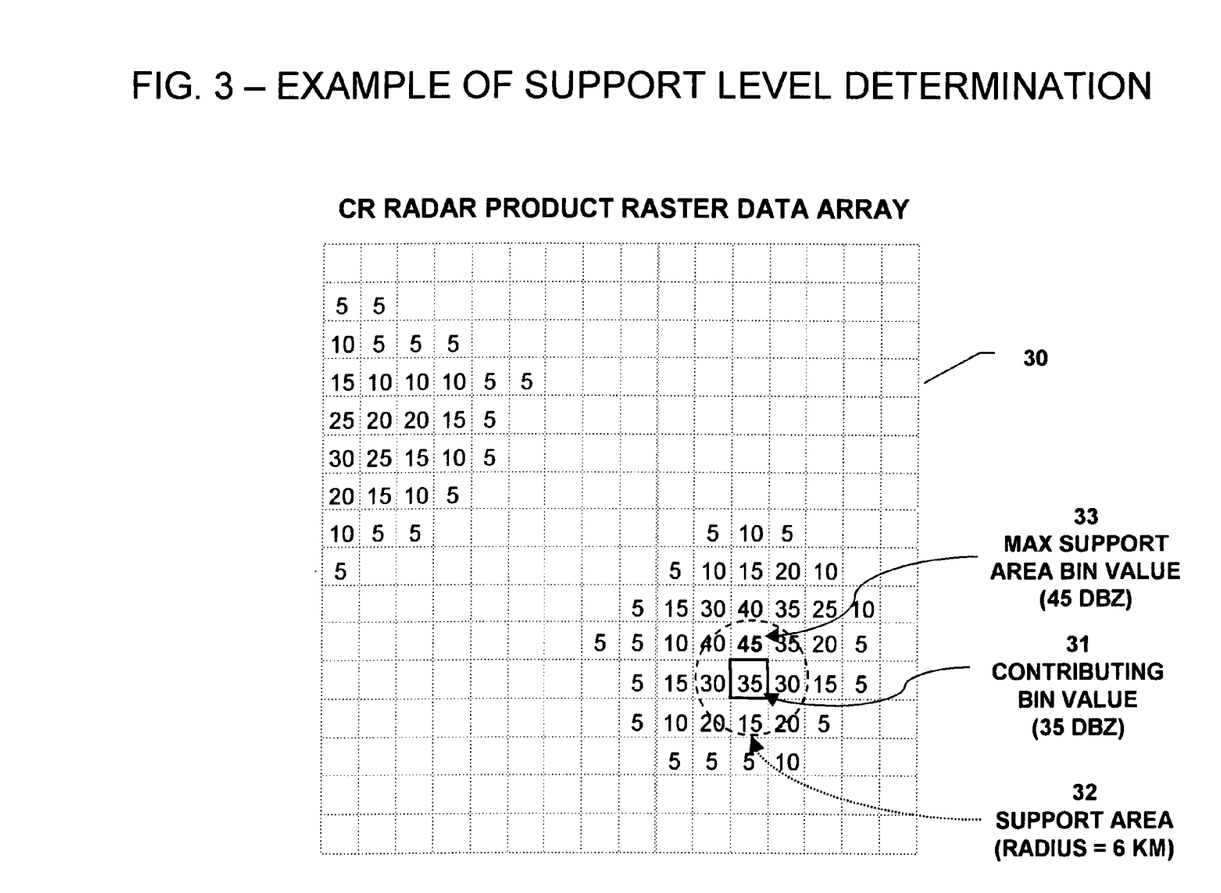
FIG. 3 is a chart used to illustrate the concept of support level determination for a contributing radar product bin.

The radar product bin support level specifies the level of support that the contributor bin can provide for the other contributing radar product bins from other radars. In the following tests, the support level information for other contributing bins is the basis for determining if the highest contributor value should be accepted or rejected. Refer to FIG. 3 which illustrates how the support level is determined for a contributing radar product bin from the radar product data of that radar. This Figure shows a portion 30 of a CR radar product raster data array. The value of each radar product bin is shown in Dbz units. Product bins with no data level specified have data levels less than the significant return threshold level. The support level value for a contributing radar product bin is the maximum data level of the surrounding radar product bins whose center points fall within a specified radius of the radar product bin. The support level computed for a radar product bin can therefore be greater than the radar product bin value. In this example the radar product bin that contributes to the mosaic bin is the highlighted bin 31. The contributing bin has a value of 35 Dbz. The support area for this contributing bin is the circular area 32 centered on the contributing radar product bin. The support area radius used in preferred embodiment is 6 km (other values for the support area radius could be used to adapt the algorithm for specific applications). There are nine radar product bins (including the contributing radar product bin 31) whose center points fall within the support area. The highest data level in this group of nine bins is 45 Dbz 33. The support level provided by this contributing radar product bin is therefore 45 Dbz. Using the support level information instead of the contributing bin values in the tests for validating the highest contributor value compensates for the inexact spatial and time correlation of inputs from multiple radars that is inherent in the mosaic generation process. It also compensates for tilt in cloud structures. Using the support level information instead of the contributing bin values significantly improves the performance of the algorithm in preserving valid weather returns on the edges of weather masses and in regions where there are steep horizontal intensity gradients.

The minimum radar coverage elevation is the corresponding composite reflectivity product radar coverage map bin value. The elevation coverage range of the composite reflectivity product data is nominally from the surface of the earth to the maximum radar coverage elevation (i.e. 60,000 feet or 18,000 meters). However, the actual elevation coverage range of a WSR-88D composite reflectivity product data varies throughout the coverage area of the radar due to the effects of earth curvature and terrain blockage. The elevation coverage range for a particular radar product bin extends from some minimum radar coverage elevation up to the maximum radar coverage elevation. The composite reflectivity product coverage map specifies the minimum elevation actually scanned by the radar for each radar product bin. This minimum radar coverage elevation takes into account the effects of earth curvature, standard atmospheric refraction, and terrain blockage. Details of how we prefer to handle this are described in U.S. Pat. No. 6,771,207, referenced above, although there could be other ways to describe minimum radar coverage that could work with this invention.

The radar product bin update time is the time the corresponding radar product was received by the mosaic generator. Alternately, if accurate radar product generation time information is available, the radar product generation time can be used. WSR-88D radar products contain product generation time information as part of the radar product header information. However, since the WSR-88D radars do not utilize a synchronized time source, this information has been relatively inaccurate. Therefore, in developing algorithms for generating mosaic products from WSR-88D product data, the product receive time is used for the bin update time. The bin update time information is used in the low-confidence contributor test to identify contributors that may represent rapidly developing weather conditions.

2 Determination of Weather Envelope Elevation

Weather envelope elevation in our preferred embodiment is determined from the support level and minimum radar coverage elevation data. The weather envelope elevation is somewhat analogous to what is known to those in these arts as an echo top elevation. Where the echo tops elevation specifies the maximum elevation where radar returns above a threshold level (for example, 30 Dbz) have been detected, the weather envelope elevation specifies the lowest elevation above which one of the contributing radars has detected nothing. It is an initial estimate of the elevation below which high confidence weather returns may occur. Whereas an echo tops elevation is determined from radar returns that exceed a specified return threshold level (i.e. 30 Dbz), the weather envelope elevation is determined from radar returns that are less than the significant return threshold (i.e. 5 Dbz). Determination of the weather envelope elevation is based on the assumption that weather located within elevation ranges actually scanned by a radar can be seen by (i.e. is not invisible to) a radar. The weather envelope elevation for a mosaic bin is equal to the lowest minimum radar coverage elevation of the subset of radar product bins with a support level value below the significant return threshold (the radars that are reporting no significant returns). Stated another way, it is the minimum coverage elevation of the radar with the best view that sees nothing.

Figure 4:
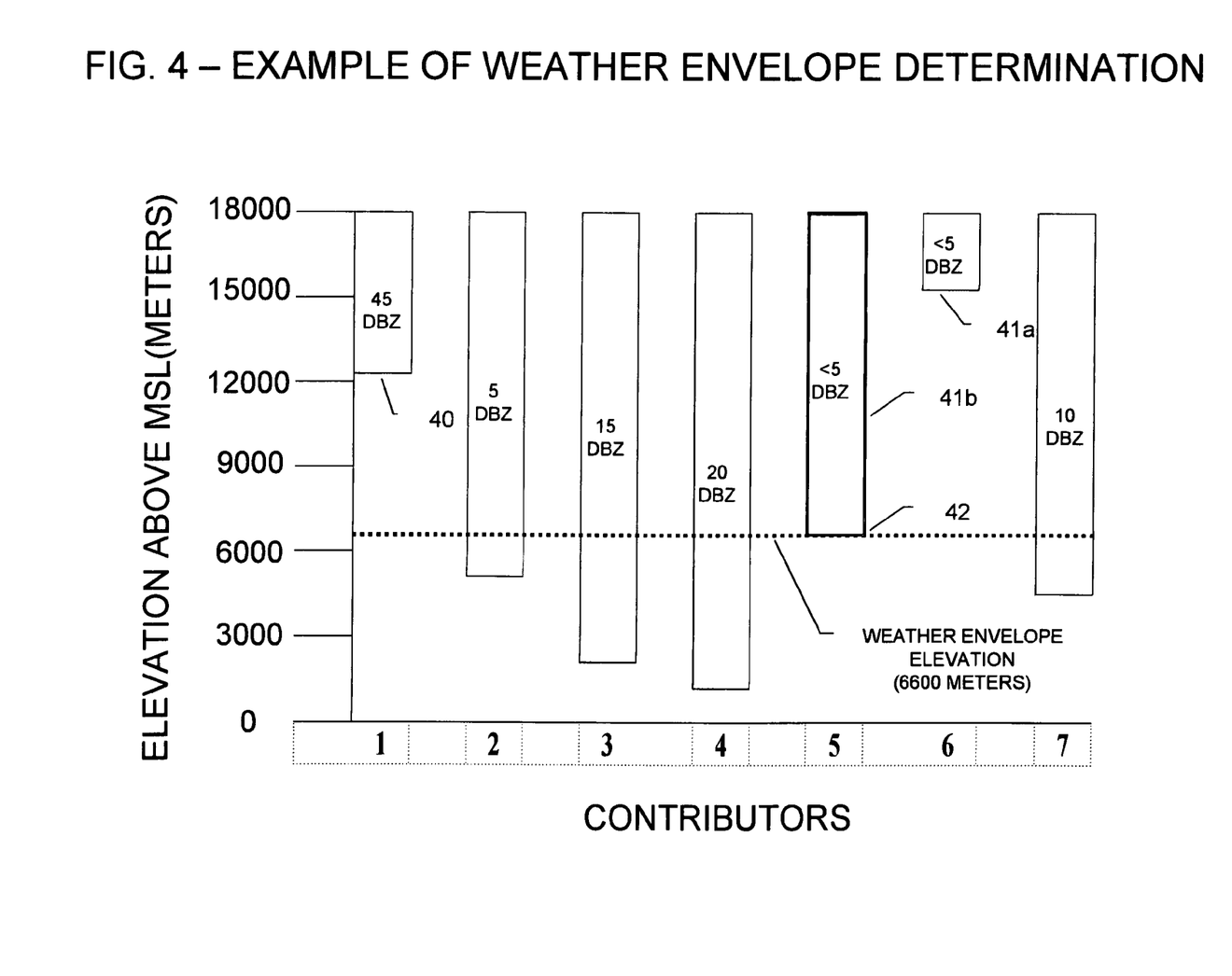
FIG. 4 is a graph which illustrates the concept of weather envelope determination for a mosaic product bin.

Refer to FIG. 4 which is an example of how the weather envelope elevation is determined for a mosaic bin from a set of contributing radar product bin information. The mosaic bin in this example has seven contributing radar product bins. The Figure shows the elevation coverage range and the bin support level value for each of the contributing radar product bins. For example, the first contributor 40 provides coverage for the range of elevations from 12400 meters up to the maximum CR product coverage elevation of 18000 meters. The minimum radar coverage elevation for this contributor is 12400 meters. The radar has detected 45 Dbz returns in the support area for this contributing bin somewhere between the 12400 meter and 18000 meter elevations. Two of the seven contributing radar product bins in this example, contributor #5 41*a* and #6 41*b* have support levels less than the significant return threshold (i.e. <5 Dbz). For contributor #5, the minimum radar coverage elevation is 6600 meters; for contributor #6, the minimum radar coverage elevation is 15400 meters. Of these two contributors, contributor #5 has the lower minimum radar coverage elevation. The weather envelope elevation for the mosaic bin indicated by the dashed line 42 is therefore 6600 meters.

For the case where all of the contributing radar product bins are reporting significant radar returns (there are no contributing bins with data levels below the significant return threshold), the weather envelope elevation is equal to the maximum product coverage elevation (i.e. 18,000 meters for the WSR-88D CR product).

Weather envelope information determined in this or similar ways could be used to generate a mosaic product similar to an echo tops mosaic product. A weather envelope product could provide useful information in flight control operations for identifying minimum clear air operating elevations for aircraft in certain types of synoptic weather scenarios.

3 Classify Contributing Radar Product Bins

The weather envelope elevation for the mosaic bin is used to classify the contributing radar product bins as either high-confidence or low-confidence contributors. Contributing bins with minimum radar coverage elevations less than or equal to the weather envelope elevation are classified as primary contributors. Contributing bins with minimum radar coverage elevations greater than the weather envelope elevation are classified as secondary contributors. This classification step is an important component of the algorithm. A significant fraction of the non-meteorological returns that contaminate the radar product data are in radar product bins with relatively high minimum radar coverage elevations (i.e. far range or terrain obstructed bins). By using the weather envelope elevation to identify and classify these contributors as low-confidence contributors, they are not used in the high-confidence contributor test used to make the initial data level selection for the mosaic bin. The low-confidence contributor data may represent valid weather returns (i.e. the most recent returns from rapidly developing weather). After an initial value for the mosaic bin is selected by the high-confidence contributor test, the low-confidence contributor test is performed to determine if the mosaic bin value should be increased to reflect returns that may be the result of rapidly developing weather.

Figure 5:
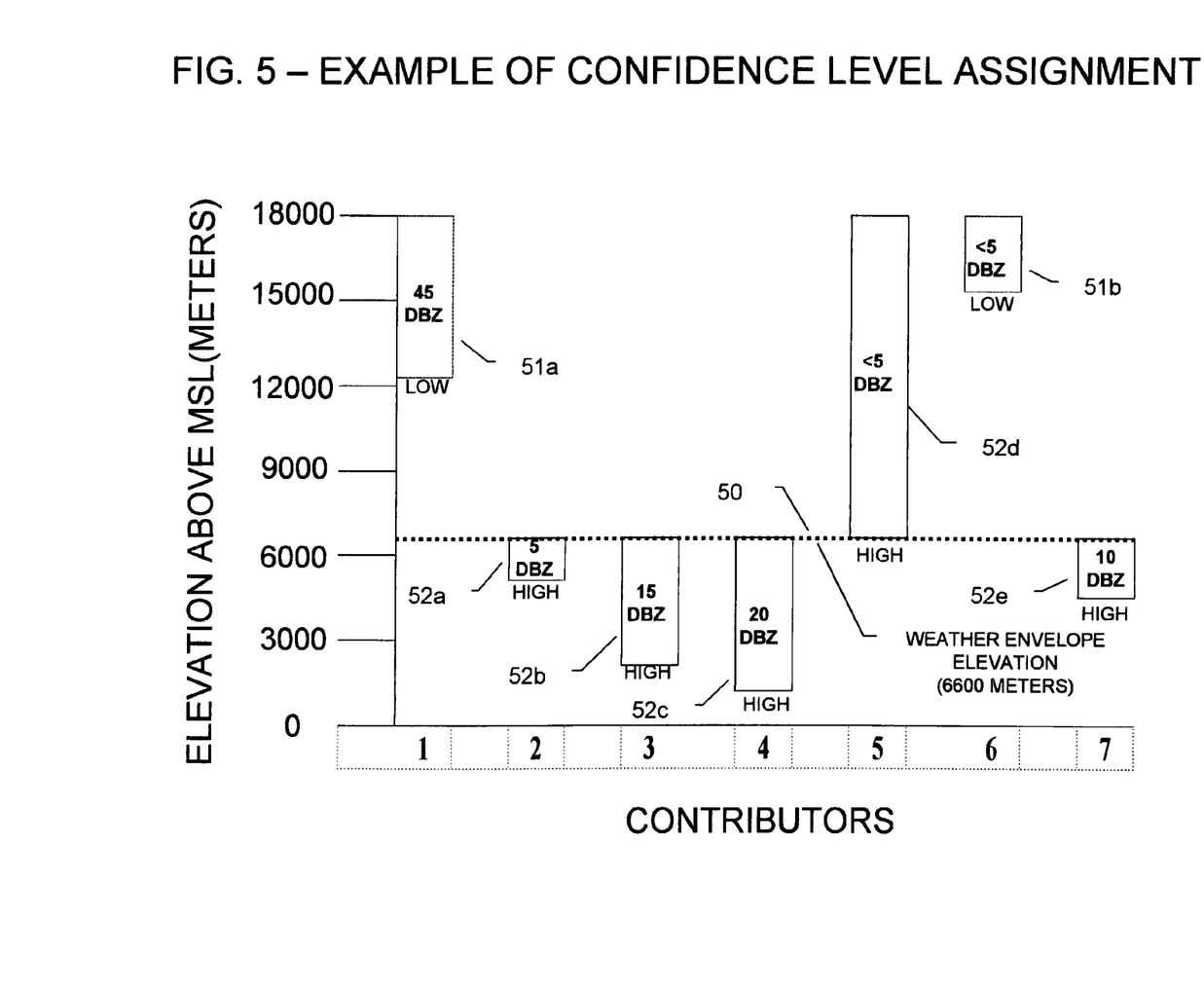
FIG. 5 is a graph which illustrates the assignment of confidence levels to contributing radar product bins based of weather envelope elevation and contributor minimum radar coverage elevations.

Refer to FIG. 5 which illustrates how each of the contributors in the data set shown in FIG. 4 is classified. The weather envelope elevation is indicated by the dashed line 50. Contributors #1 51a and #6 51b are classified as low confidence contributors because their minimum radar coverage elevations are greater than the weather envelope elevation. Contributors #2 52a, #3 52b, #4 52c, #5 52d, and #7 52e are classified as high confidence contributors because their minimum radar coverage elevations are less than or equal to the weather envelope elevation. Note that the contributor which determines the weather envelope elevation 52d is always classified as a high confidence contributor. Note also that contributor #51a, which has a data level significantly higher than data levels for contributors that have a better view (i.e. a lower minimum radar coverage elevation), has been classified as a low-confidence contributor. Note that in FIG. 5 the upper elevation limits of the coverage ranges for contributors #2 52a, #3 52b, #4 52c, and #7 52e have been reduced from the maximum CR product coverage elevation to the weather envelope elevation. This reflects the fact that contributor #5 52d has not detected any significant returns in its coverage range.

4 Determine Highest and Second-Highest Primary Contributor Data Levels

The following data is extracted from the subset of contributing radar product bins classified as high-confidence contributors:

1. Highest high-confidence contributor data level
2. Second highest high-confidence contributor data level
3. Support level for the highest high-confidence contributor data level The highest primary contributor data level is the highest radar product bin value from the subset of contributing bins classified as high-confidence contributors. The remaining high-confidence contributor bins are used to determine the second highest high-confidence contributor data level and the support level for the highest high-confidence contributor data level. The second highest high-confidence contributor data level is the highest radar product bin value from the remaining high-confidence contributor bins (note that the second highest high-confidence contributor data level may be equal to the highest high-confidence contributor data level). The support level for the highest high-confidence contributor data level is the highest support level value from the remaining high-confidence contributor bins (note that the support level value may exceed the highest high-confidence contributor data level).

5 High-Confidence Contributor Tests

There are two tests that are used to select either the highest or second highest high-confidence contributor data level for the mosaic bin value. The test used depends on the value of the support level for the highest high-confidence contributor data level. If the support level is at or above the significant return threshold (at least two of the high-confidence contributors are reporting significant returns), the Case 1 high-confidence contributor test is used. If the support level is less than the significant return threshold (only one high-confidence contributor is reporting a significant return), then the Case 2 high-confidence contributor test is used.

5.1 Case 1 High-Confidence Contributor Test

Figure 6:
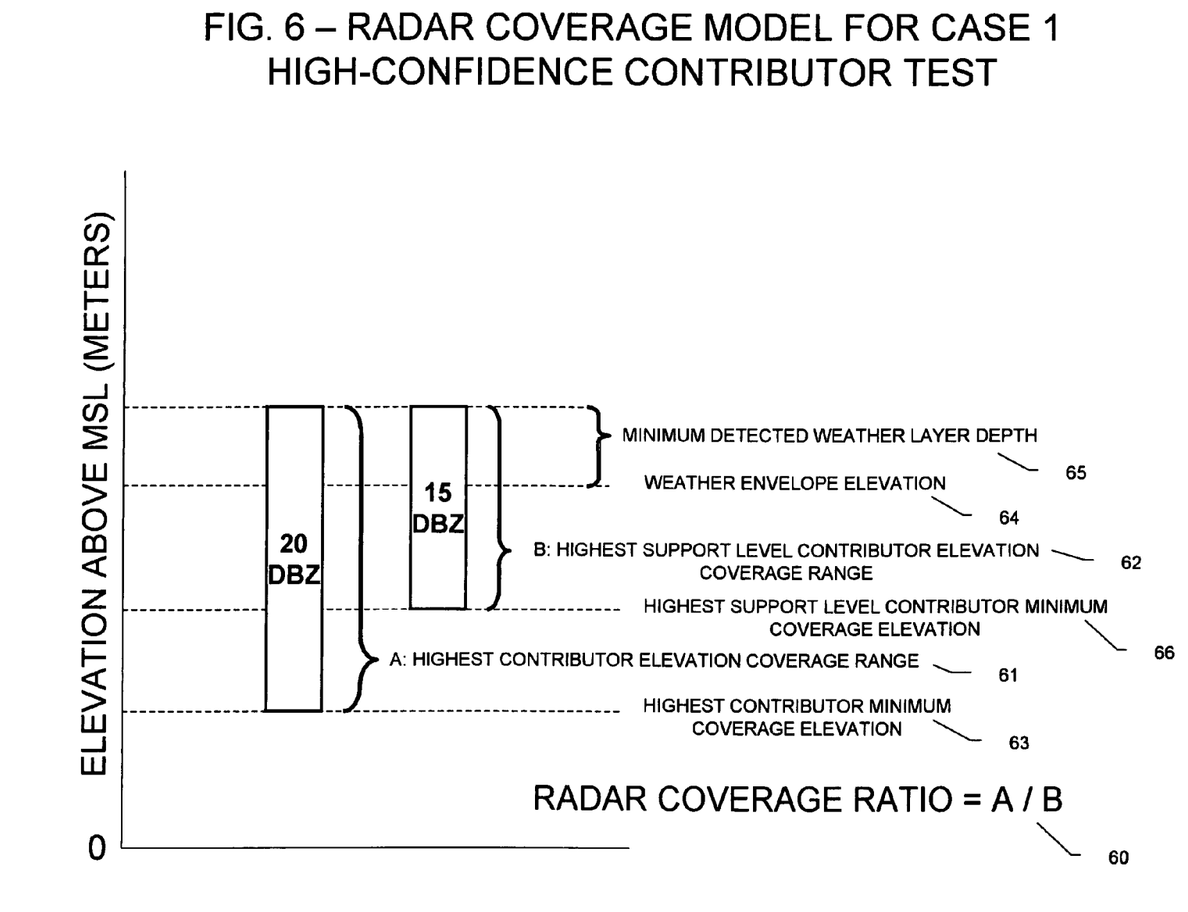
FIG. 6 is a graphic illustration of the radar coverage model used to evaluate high confidence contributor data when multiple high-confidence contributors have detected significant returns.

This test is performed when there are at least two high-confidence contributors that are reporting significant returns for the mosaic bin. This test first computes the difference between the highest contributor data level and the support level for the highest contributor value. If the difference between the weather envelope elevation and the minimum coverage elevation of the maximum support contributor is greater than the minimum non-overlapping contributor offset parameter value, then the weather envelope elevation is reset to the minimum coverage elevation of the maximum support contributor plus the non-overlapping contributor offset value. This adjustment to the weather envelope elevation is made to yield more reasonable values in the subsequent radar coverage ratio computation when the weather envelope elevation is significantly higher than the minimum coverage elevation of the maximum support contributor. It then computes a radar coverage ratio based on the minimum radar coverage elevations for the highest contributor and the contributor that provides the highest support level for the highest contributor. The coverage ratio is a measure of the comparative coverage that these two contributors have of the elevation range where the highest returns have been detected. Refer to FIG. 6 which illustrates the model used for computing the radar coverage ratio. The coverage ratio 60 is the ratio of the elevation coverage ranges for the highest contributor 61 and the highest support level contributor 62. The coverage range for the highest contributor 61 extends from the minimum coverage elevation for the highest contributor 63 up to weather envelope elevation 64 plus the minimum detected weather layer depth parameter value 65. The coverage range for the highest support level contributor 62 extends from the minimum coverage elevation for the highest support level contributor 66 up to weather envelope elevation 64 plus the minimum detected weather layer depth parameter value 65. The minimum detectable weather layer depth parameter is an adaptable parameter that is included in the computation to prevent the computed coverage ratio values from becoming too large or too small when the minimum radar coverage elevation for either of contributors 63 or 66 is close to the weather envelope elevation 64. The radar coverage ratio and the highest contributor data level are then used to determine the maximum acceptable difference between the highest contributor data level and the highest support data level for selecting the highest contributor value as the mosaic bin value. The maximum acceptable difference values are contained in a support level adaptation data array that is indexed based on the computed radar coverage ratio value and the highest contributor data level. Higher coverage ratios (highest contributor has a better view than highest support level contributor) have larger maximum acceptable difference values (relaxed support criteria). Lower coverage ratios (highest support level contributor has a better view than highest contributor) have smaller maximum acceptable difference values (tighter support criteria). The difference between the highest contributor data level and the highest support level is compared to the maximum acceptable difference value. If the difference is less than or equal to the maximum acceptable difference value, the highest contributor data level is selected as the mosaic bin value (there is adequate support for the highest contributor data level). If the difference is greater than the maximum acceptable difference value, the second highest contributor data level is selected for the mosaic bin value (there is not adequate support for the highest contributor data level). Refer to the Adaptable Parameter Description section for additional information on the non-overlapping contributor offset and minimum detectable weather layer depth parameters and the support level data array data.

5.2 Case 2 High-Confidence Contributor Test

When this test is performed, there are effectively only two primary contributors. The contributor with the best view (lowest minimum radar coverage elevation) is reporting a significant return (the highest contributor), and the contributor with the next best view is reporting no significant returns (second highest contributor). A series of four validity checks are performed to determine whether the highest contributor data level should be used. These checks, which are based on the minimum radar coverage elevations of the two contributors, are performed in the sequence described below until one of the checks determines the mosaic bin value. If none of the checks selects the mosaic bin value, the highest contributor value is rejected and the mosaic bin is set to the no significant returns value. The four validity checks are:

1. Boundary layer check—reject the highest contributor value.
2. Overlapping elevation coverage range check—reject the highest contributor value.
3. Non-overlapping elevation coverage range check—accept the highest contributor value.
4. Vertical gradient check—accept the highest contributor value.

Figure 7:
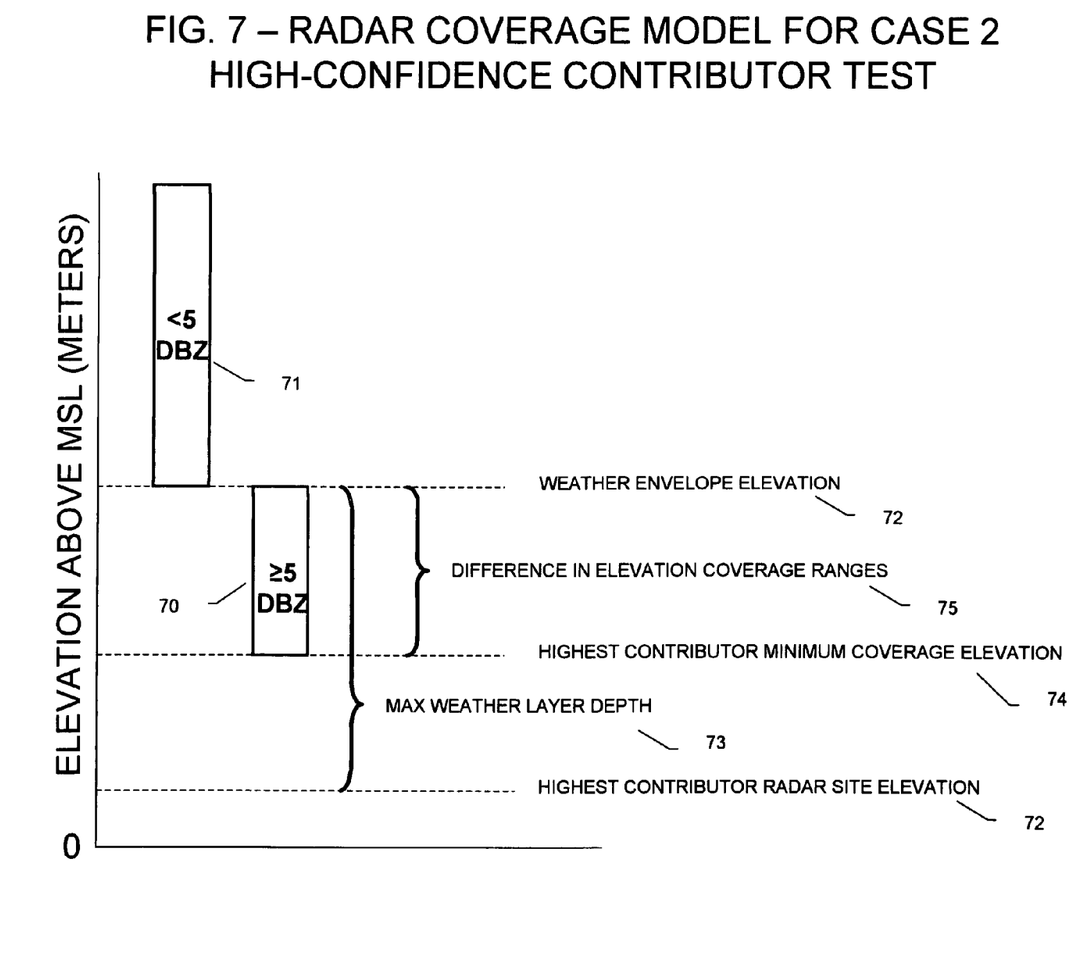
FIG. 7 is a graphic illustration of the radar coverage model used to evaluate high confidence contributor data when only one high-confidence contributor has detected significant returns.

Refer to FIG. 7 which illustrates the model used for performing these checks. The Figure shows the elevation coverage ranges for the highest contributor 70 and the second highest contributor 71. Note that the second highest contributor 71 is also the contributor that determines the weather envelope elevation 72.

For the boundary layer check, the difference 74 between the weather envelope elevation 72 and the highest contributor radar site elevation 73 is computed. This difference 74 is effectively the maximum weather layer depth. A small value for this difference indicates that the weather envelope elevation is relatively close to the ground, and the highest contributor returns 70 are coming from the boundary layer near the earth's surface. The assumption is that if the computed weather layer depth 74 is too small, the highest contributor returns are not valid weather returns. Therefore, if the computed difference 74 is less than a boundary layer height parameter value, then the highest contributor data level is rejected. Set the mosaic bin value to the second highest contributor data level (i.e. no significant returns) and skip the remaining checks. Refer to the Adaptable Parameter Description section for additional information on the boundary layer height parameter.

For the overlapping elevation coverage range check, the difference 76 between the weather envelope elevation 72 and the highest contributor minimum radar coverage elevation 75 is computed. This difference in the elevation coverage ranges for the two contributors 76 is effectively the depth of the layer where the highest contributor radar may have detected valid weather returns. A small value for this difference indicates that the elevation coverage ranges for the two contributors are essentially the same. The assumption is that if the computed difference 76 is small, the highest contributor returns 70 are not valid weather returns since the second highest contributor 71, having a very similar elevation coverage range, has detected no significant returns. Therefore, if the computed difference 76 is less than the maximum overlapping contributor offset parameter value, then the highest contributor data level is rejected. Set the mosaic bin value to the second highest contributor data level (i.e. no significant returns) and skip the remaining checks. Refer to the Adaptable Parameter Description section for additional information on the maximum overlapping contributor offset parameter.

For the non-overlapping elevation coverage range check, the difference 76 computed for the previous check is also used. The assumption is that if the computed difference 76 is large (there is a significant difference in the elevation coverage ranges of the two contributors) then there is no basis for rejecting the highest contributor data level since the highest contributor has significantly better radar coverage for the mosaic bin than the second highest contributor. The non-overlapping elevation coverage range check also includes a data level test. In a convective weather situation where there is a significant vertical extent to weather formations, radars with a relatively high minimum radar coverage elevation should still be able to detect significant weather returns. Therefore, if the highest contributor data level is less than the convective weather threshold parameter value and the computed difference 76 is greater than the minimum non-overlapping contributor offset parameter value, then the highest contributor data level is accepted. Set the mosaic bin value to the highest contributor data level and skip the remaining check. Refer to the Adaptable Parameter Description section for additional information on the convective weather threshold and minimum non-overlapping contributor offset parameters.

For the vertical reflectivity gradient check, the vertical reflectivity gradient (for example in units of Dbz/km) is computed from the difference in the data levels of the two contributors and the elevation difference 76 computed for the second check. The basis of this check is the assumption that if the vertical reflectivity gradient is not excessive then the highest contributor data level should be used. Therefore, if the computed vertical reflectivity gradient is less than the maximum vertical reflectivity gradient parameter value, then the highest contributor data level is accepted. Set the mosaic bin value to the highest contributor data level. Otherwise, set the mosaic bin value to the second highest contributor data level (i.e. no significant returns). Refer to the Adaptable Parameter Description section for additional information on the maximum vertical reflectivity gradient parameter.

6 Secondary Contributor Test

After the mosaic bin value has been selected for the mosaic bin by one of the high-confidence contributor tests described in the previous section, the low-confidence contributor data (if any of the contributors have been classified as low-confidence data) is evaluated by this test. This test determines if the value selected by the high-confidence contributor test should be increased to reflect rapidly developing weather. The low-confidence contributor returns may be the result of rapidly developing weather that should be included in the mosaic product. In order for a low-confidence contributor to be considered, it must satisfy the following conditions:

1. The contributor data level must be greater than the currently selected mosaic bin value.
2. The contributor bin update time must be more recent than the update time of the contributor currently selected as the mosaic bin value.
3. Minimum radar coverage elevation of the contributor must not exceed the maximum weather formation elevation parameter (the assumption is that weather does not develop at high elevations).

If all three of these conditions are satisfied, the reflectivity growth rate (in units of Dbz/minute) is computed from the bin data level and bin update time information of the low-confidence contributor and the contributor currently selected as the mosaic bin value. If the reflectivity growth rate does not exceed the maximum reflectivity growth rate parameter value, the mosaic bin value is increased to the value of the low-confidence contributor bin data level.

Each of the low-confidence contributor bins is subjected to this test. It is possible that the mosaic bin value could be adjusted upward multiple times. At the conclusion of this test, the mosaic product array bin is set to the selected mosaic bin value. Refer to the Adaptable Parameter Description section for additional information on the maximum weather formation elevation and maximum reflectivity growth rate parameters.

Thus the invention is described.

Adaptable Parameter Description

Table 1 is a list of the adaptable parameters used by the mosaic generation algorithm. During the development of this algorithm, the values of these adaptable parameters were adjusted to improve the overall performance of the algorithm in generating radar mosaic products for use in air traffic control applications. Using the parameter values shown in Table 1 produced consistent results for a large set of test cases that included a variety of synoptic weather scenarios, in different areas of continental US (CONUS) airspace. Using these parameter values in the algorithm for generating radar mosaic products from WSR-88D composite reflectivity is effective in removing a high percentage of the non-meteorological returns from the mosaic products and retaining a very high percentage of the valid weather returns. The algorithm configured with these parameter values is effective in preserving severe weather returns which have the highest potential impact on air traffic control operations.

The structure and support level values in the support level array shown in Table 2 were determined from a statistical analysis of representative radar product data sets for different types of synoptic weather scenarios in different CONUS radar coverage areas. Values at or near these levels are recommended for use with the invention herein.

Other values for these parameters can be used to optimize the performance of the algorithm for other types of applications.

TABLE 1

Recommended Adaptable Parameter Values

| Parameter Name | Parameter Value |
| --- | --- |
| Minimum detectable weather layer depth | 1000 Meters |
| Support level array | See Table 2 |
| Boundary layer height | 2500 Meters |
| Maximum overlapping contributor offset | 600 Meters |
| Convective weather threshold | 50 Dbz |
| Minimum non-overlapping contributor offset | 4000 Meters |
| Maximum vertical reflectivity gradient | 15.1 Dbz/km |
| Maximum weather formation elevation | 6200 Meters |
| Maximum reflectivity growth rate | 3 Dbz/minute |

TABLE 2

Recommended Support Level Array Values

| | Highest Contributor Data Level | | |
| --- | --- | --- | --- |
| Coverage Ratio | $\geq$5 Dbz → <30 Dbz | $\geq$30 Dbz → <55 Dbz | $\geq$55 Dbz |
| <.5 | 5 Dbz | 5 Dbz | 0 Dbz |
| $\geq$.5 → <.6 | 10 Dbz | 10 Dbz | 5 Dbz |
| $\geq$.6 → <.7 | 10 Dbz | 10 Dbz | 5 Dbz |
| $\geq$.7 → <.8 | 10 Dbz | 10 Dbz | 10 Dbz |
| $\geq$.8 → <.9 | 10 Dbz | 10 Dbz | 10 Dbz |
| $\geq$.9 → <1.0 | 10 Dbz | 10 Dbz | 10 Dbz |
| $\geq$1.0 → <1.1 | 15 Dbz | 15 Dbz | 15 Dbz |
| $\geq$1.1 → <1.2 | 15 Dbz | 15 Dbz | 15 Dbz |
| $\geq$1.2 → <1.3 | 15 Dbz | 20 Dbz | 20 Dbz |
| $\geq$1.3 → <1.4 | 15 Dbz | 20 Dbz | 20 Dbz |
| $\geq$1.4 → <1.5 | 20 Dbz | 25 Dbz | 25 Dbz |
| $\geq$1.5 | 20 Dbz | 35 Dbz | 30 Dbz |

GLOSSARY

Composite reflectivity product—This is a radar product that includes data gathered by the radar for all elevation tilts.

Confidence level—This is an assessment of whether the data level for a particular contributing radar product bin accurately reflects weather conditions at the corresponding geographic location; confidence levels are either high or low.

Contributing bin—A radar product bin that provides input to a particular mosaic product bin; a geographic location (i.e. latitude\longitude coordinates) of the center point of contributing radar product bin fall within the mosaic bin coverage area.

Contributing radar—One of the radars that provides coverage for some portion of a radar mosaic product coverage area Contributor—A radar product bin that provides input to a particular mosaic product bin; a geographic location (i.e. latitude\longitude coordinates) of the center point of contributing radar product bin fall within the mosaic bin coverage area.

Data level—This is the quantitative value of a radar product bin.

Dbz—This is the unit of measure of the amount of water in the liquid state in a unit volume of air.

Elevation tilt—The data set collected by a weather radar while scanning at a constant antenna elevation angle through 360° of azimuth.

Highest contributor—In a set of contributing radar product bins, it is the contributing radar product bin that has the highest data level value, Highest contributor algorithm—A mosaic generation algorithm that assigns each mosaic bin the value of the highest contributor from the set of contributing radar product bins.

Minimum radar coverage elevation—The lowest elevation with respect to mean sea level that is actually scanned by the radar for each radar product bin; it accounts for the effects of earth curvature, terrain blockage, and atmospheric refraction on radar data collection.

Mosaic product—A product generated by combining inputs from multiple weather radars in order to view weather over an extended geographic region that exceeds the coverage area of a single radar.

Mosaic product bin—A single element of a mosaic product array; the product bin specifies a product data level for a small area (i.e. 4 km×4 km) at a specific geographic location.

Radar coverage map—This is a map that specifies radar coverage information for a particular radar product; it is a data array that has a one-to-one correspondence with the radar product array; each coverage map bin specifies a radar coverage value for the corresponding radar product bin; coverage maps for composite reflectivity products specify the minimum elevation with respect to mean sea level that is actually scanned by the radar for each radar product bin.

Radar product—In the context of mosaic generation, a radar product specifies data level information for some type of radar generated information (i.e. reflectivity level) for the geographic area covered by the radar.

Radar product bin—A single data element of a radar product array; the product bin specifies a product data level for a small area (i.e. 4 km×4 km, or 0.2°×2 km) at a specific geographic location within the radar coverage area Significant return—This is a data level for a radar or mosaic product that equals or exceeds a specified threshold level; in the context of this invention, the significant return threshold level is 5 Dbz.

Synoptic—relating to or displaying conditions (as of the atmosphere or weather) as they exist simultaneously over a broad area.

Support level—This is the measure of the degree of support that a contributing radar product bin can provide for validating other contributing radar product bins.

Terrain blockage—This is the result of terrain features which are high enough with respect to the radar site elevation to effectively block the radar beam during a portion of it's volume scanning protocol.

WSR-88D radars—A network of weather radars operated jointly by the US National Weather Service, Air Force, and Federal Aviation Administration, There are approximately 140 radars that provide coverage for the contiguous 48 states.

What is claimed is:

1. A method for generating a mosaic of weather radar product maps comprising:
   assembling a contributing radar product bin data set for a mosaic bin,
   determining weather envelope elevation data for the mosaic bin,
   classifying contributing radar product bins with a low or high confidence level using weather envelope elevation data,
   determining highest and second highest high confidence contributing radar product bins,
   performing a high confidence contributor test to select an initial mosaic bin value from high confidence contributor data,
   performing a low confidence contributor test to revise the mosaic bin value using low confidence contributor data, and
   storing the resulting mosaic on a storage medium.

2. The method of claim 1 in which the determining weather envelope elevation data step determines the weather envelope from the contributing radar product bin data and radar coverage information.

3. The method of claim 1 wherein all of the bins from each of the radar product maps are processed by the steps set forth in claim 1.

4. The method of claim 3 wherein all the bins from each of the radar product maps are processed in parallel.

5. A set of computer executable instructions provided on a computer-readable medium which when executed by a computer system will configure said computer system to execute a series of predetermined steps to transform a set of weather radar products into a stored mosaic using the method of claim 1.

6. A computer-readable storage medium containing an encoded data representation of a mosaic data product resulting from execution of the steps of claim 1.

7. A computer system for collecting radar product data from overlapping areas of different area radar products, and for transforming said radar product data into a stored mosaic, said mosaic comprising bin values computed from a combination of bin values from the overlapping areas of said radar product data, said computer system comprising:
   means for assembling a contributing radar product bin data set for a stored mosaic bin,
   means for determining weather envelope elevation data for the mosaic bin,
   means for classifying contributing radar product bins with a low or high confidence level using weather envelope elevation data,
   means for determining highest and second highest high confidence contributing radar product bins,
   means for performing a high confidence contributor test to select an initial mosaic bin value from high confidence contributor data, and
   means for performing a low confidence contributor test to revise the mosaic bin value using low confidence contributor data, and
   wherein said means are responsive to a request to produce a stored mosaic from radar products.

8. The computer system of claim 7 wherein software configures said computer system to implement each said means.

9. A computer-readable storage medium containing an encoded data representation of a stored mosaic generated by the computer system of claim 7.

10. A method for determining a weather envelope comprising:
    determining said weather envelope from contributing radar product bin data and radar coverage information, wherein said contributing radar product bin data comprises an elevation coverage range and a bin support level value for each contributing radar product bin; and
    storing said weather envelope on a storage medium.

11. The method of claim 10 wherein all of the contributing radar product bins have significant radar returns, and wherein the weather envelope elevation is equal to the maximum product coverage elevation.

12. A computer-readable medium providing a set of computer executable instructions which when executed by a computer system will configure said computer system to execute a series of predetermined steps to transform a set of radar products' data into a mosaic using the method of claim 10.

13. A computer-readable storage medium containing a weather envelope data product resulting from the method of claim 10.

* * * * *